Jan. 12, 1926.  1,569,468
B. M. ELY
CHAFF REMOVER
Filed May 20, 1925
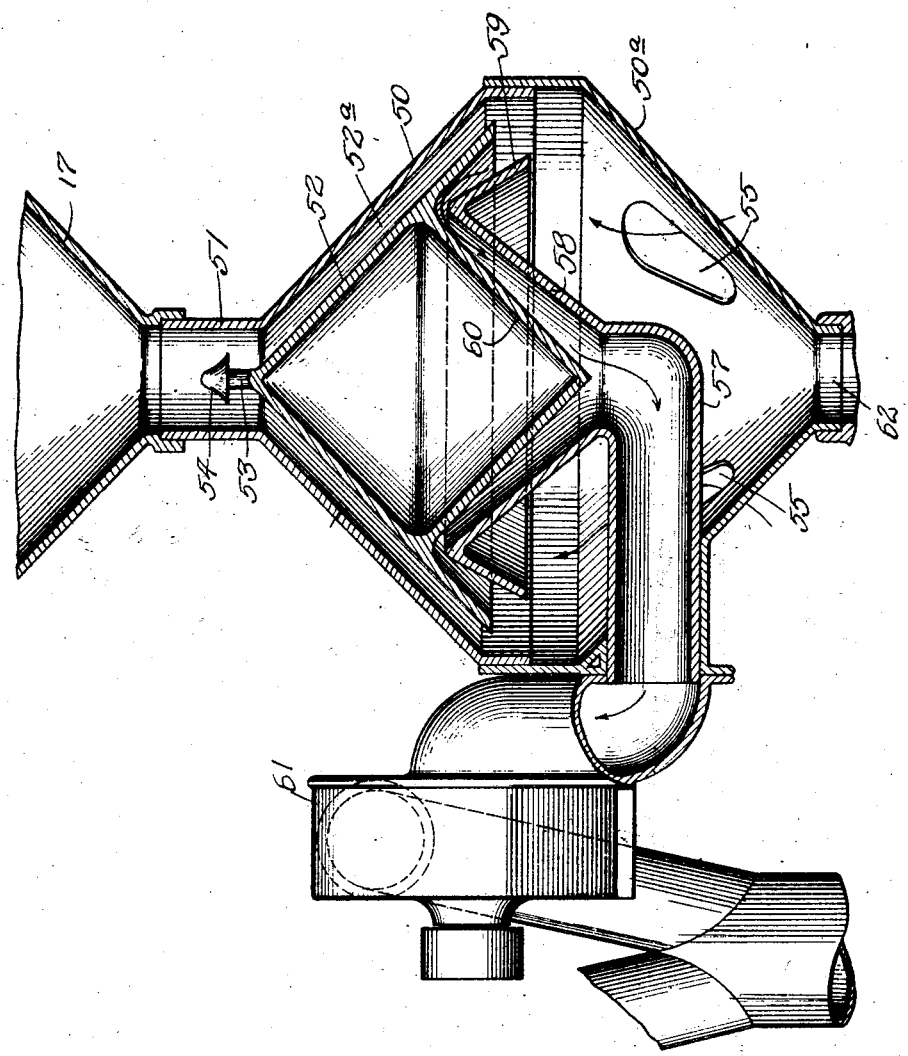
Inventor:
Bernard M. Ely,
By Dynaforth, Lee, Chritton & Wiles,
Attys.

Patented Jan. 12, 1926.

1,569,468

UNITED STATES PATENT OFFICE.

BERNARD M. ELY, OF MARSHALL, MICHIGAN, ASSIGNOR TO LAMBERT MACHINE CO., OF MARSHALL, MICHIGAN, A CORPORATION OF MICHIGAN.

CHAFF REMOVER.

Application filed May 20, 1925. Serial No. 31,570.

*To all whom it may concern:*

Be it known that I, BERNARD M. ELY, a citizen of the United States, residing at Marshall, in the county of Calhoun and State of Michigan, have invented a new and useful Improvement in Chaff Removers, of which the following is a specification.

This invention relates to improvements in chaff removers and is here shown as embodied in a device especially adapted for use in a coffee grinding machine for removing the chaff or silver skin from roasted coffee berries which have been previously broken up into a suitable size for cutting or grinding. Although the invention is shown as embodied in a device for removing the chaff or silver skin from broken coffee berries, it is evident that, without detracting from the spirit of the invention, the same may be embodied in a device for separating or removing chaff, dust, or other substances from cereals, or other materials.

The device here shown is especially adapted for forming a part of a coffee grinding machine. The other parts of the complete grinding machine, however, form no part of the present invention and consequently are not shown in detail in this case.

In that form of device embodying the features of my invention shown in the accompanying drawing, the same is shown in vertical cross section.

As shown in the drawing, 17 indicates the bottom end of a flattened funnel-shaped member which serves to conduct the broken coffee berries from the breakers (not shown) to the chaff remover.

The chaff remover comprises a casing formed of an upper upright conical part 50 and a lower inverted conical part $50^a$. At the top of the casing is a material receiving inlet 51 into which the broken coffee berries are fed from the funnel member 17. Within the casing 50 is arranged an upright conical material dispersing plate 52 having its surface parallel with the conical surface of the upper part 50 of the casing and spaced therefrom a short distance in order to provide the space $52^a$ through which the broken coffee berries or other material flow. The apex of the material dispersing plate 52 is provided with a short vertical rod 53 having a conical cap 54 on the end thereof. The rod 53 with the pointed cap 54 projects upwardly into the material receiving inlet 51.

55, 55 indicate a plurality of holes in the lower inverted conical part $50^a$. These holes or openings 55, 55 constitute air inlets. It is to be noted that these air inlets are arranged below the lower edge of the material dispersing plate 52; so that material falling from the edge of the plate 52 falls into the upwardly moving air stream entering the casing through the holes 55, 55.

57 indicates an air suction pipe entering the casing and having an enlarged circular inverted conical mouth 58 lying beneath the material dispersing plate 52. 59 indicates a frusto-conical air baffle plate surrounding the periphery of the mouth 58 and lying below and adjacent the circular lower edge of the material dispersing plate 52.

Mounted on the under side of the material dispersing plate 52 and projecting downwardly into the enlarged circular mouth 58 of the air suction pipe is an inverted conical air baffle plate 60.

Any suitable means such as a centrifugal fan indicated in general by 61 is provided for withdrawing air from the air suction pipe 57.

At the bottom of the casing 50, $50^a$ is provided a discharge opening 62 which leads to the grinding burrs, (not shown).

In the operation of the device, the broken coffee berries with the chaff and silver skin are fed from the funnel 17 into the opening 51. The material then strikes the material dispersing plate or spreading device 52 which guides the coffee, chaff, silver skin, or other ingredients evenly and thinly over its conical surface. From the lower edge of the plate 52, the material falls into the air stream entering through the holes 55, 55. The air drawn through the falling chaff and coffee, sucks the chaff, dust, or other fine substances upwardly between the baffle plate 59 and the lower edge of the plate 52, thence downwardly into the pipe 57, whence it passes out through the exhaust fan. The broken coffee, or other ingredients, thus cleaned, fall into the lower part of the casing $50^a$ and thence out through the discharge opening 62 to the finishing burrs. The direction of the air current is shown by the arrows.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as possible in view of the prior art.

What I claim as new, and desire to secure by Letters Patent, is:

1. A device of the character described comprising; a casing having a material receiving inlet; an upright conical material dispersing plate within said casing lying below said inlet; an air suction pipe entering said casing and having an enlarged mouth lying beneath the conical material dispersing plate; a frusto-conical air baffle plate surrounding the mouth of the air suction pipe and lying below and adjacent to the circular lower edge of the material dispersing plate; said casing being closed adjacent the edges of the material dispersing plate and the air baffle plate, and having an air inlet a substantial distance below said edges; an air exhausting means attached to the outer end of the air suction pipe.

2. A device of the character described comprising; a casing having a material receiving inlet; an upright conical material dispersing plate within said casing lying below said inlet and having its apex projecting up into said inlet; an air suction pipe entering said casing and having an enlarged mouth lying beneath the conical material dispersing plate; a frusto-conical air baffle plate surrounding the mouth of the air suction pipe and lying below and adjacent to the circular lower edge of the material dispersing plate; said casing being closed adjacent the edges of the material dispersing plate and the air baffle plate, and having an air inlet a substantial distance below said edges; and air exhausting means attached to the outer end of the air suction pipe.

3. A device of the character described comprising; a casing having a material receiving inlet; an upright conical material dispersing plate within said casing lying below said inlet; an air suction pipe entering said casing and having an enlarged circular mouth lying beneath the conical material dispersing plate; a frusto-conical air baffle plate surrounding the mouth of the air suction pipe and lying below and adjacent to the circular lower edge of the material dispersing plate; said casing being closed adjacent the edges of the material dispersing plate and the air baffle plate, and having an air inlet a substantial distance below said edges; an air exhausting means attached to the outer end of the air suction pipe.

4. A device of the character described comprising; a casing having a material receiving inlet; an upright conical material dispersing plate within said casing lying below said inlet; an air suction pipe entering said casing and having an enlarged circular mouth lying beneath the conical material dispersing plate; a frusto-conical air baffle plate surrounding the mouth of the air suction pipe and lying below and adjacent to the circular lower edge of the material dispersing plate; said casing being closed adjacent the edges of the material dispersing plate and the air baffle plate, and having an air inlet a substantial distance below said edges; an inverted conical air baffle plate on the under side of the material dispersing plate and projecting downwardly into the enlarged circular mouth of the air suction pipe; and air exhausting means attached to the outer end of the air suction pipe.

5. A device of the character described comprising; a casing having a material receiving inlet; an upright conical material dispersing plate within said casing lying below said inlet; an air suction pipe entering said casing and having an enlarged circular inverted conical mouth lying beneath the conical material dispersing plate; a frusto-conical air baffle plate surrounding the mouth of the air suction pipe and lying below and adjacent to the circular lower edge of the material dispersing plate; said casing being closed adjacent the edges of the material dispersing plate and the air baffle plate, and having an air inlet a substantial distance below said edges; and air exhausting means attached to the outer end of the air suction pipe.

6. A device of the character described comprising; a casing having an upper conical part and a lower inverted conical part, said casing having a material receiving inlet; an upright conical material dispersing plate within said casing lying below said inlet; an air suction pipe entering said casing and having an enlarged mouth lying beneath the conical material dispersing plate; a frusto-conical air baffle plate surrounding the mouth of the air suction pipe and lying below and adjacent to the circular lower edge of the material dispersing plate; said casing being closed adjacent the edges of the material dispersing plate and the air baffle plate and having an air inlet in the lower inverted conical part a substantial distance below said edges; and air exhausting means attached to the outer end of the air suction pipe.

7. A device of the character described comprising; a casing having an upper conical part and a lower inverted conical part, said casing having a material receiving inlet; an upright conical material dispersing plate within said casing lying below said inlet, and having its apex projecting up into said inlet; an air suction pipe entering said casing and having an enlarged mouth lying beneath the conical material dispersing plate; a frusto-conical air baffle plate surrounding the mouth of the air suction pipe and lying below and adjacent to the circular lower edge of the material dispersing plate; said casing being closed adjacent the edges of the material dispersing plate and the air baffle plate and having an air inlet in the lower inverted conical part a substantial distance below said edges; and air exhausting means attached to the outer end of the air suction pipe.

8. A device of the character described comprising; a casing having an upper conical part and a lower inverted conical part, said casing having a material receiving inlet; an upright conical material dispersing plate within said casing lying below said inlet; an air suction pipe entering said casing and having an enlarged circular mouth lying beneath the conical material dispersing plate; a frusto-conical air baffle plate surrounding the mouth of the air suction pipe and lying below and adjacent to the circular lower edge of the material dispersing plate; said casing being closed adjacent the edges of the material dispersing plate and the air baffle plate and having an air inlet in the lower inverted conical part a substantial distance below said edges; and air exhausting means attached to the outer end of the air suction pipe.

9. A device of the character described comprising; a casing having an upper conical part and a lower inverted conical part, said casing having a material receiving inlet; an upright conical material dispersing plate within said casing lying below said inlet; an air suction pipe entering said casing and having an enlarged circular mouth lying beneath the conical material dispersing plate; a frusto-conical air baffle plate surrounding the mouth of the air suction pipe and lying below and adjacent to the circular lower edge of the material dispersing plate; said casing being closed adjacent the edges of the material dispersing plate and the air baffle plate and having an air inlet in the lower inverted conical part a substantial distance below said edges; an inverted conical air baffle plate on the underside of the material dispersing plate and projecting downwardly into the enlarged circular mouth of the air suction pipe; and air exhausting means attached to the outer end of the air suction pipe.

10. A device of the character described comprising; a casing consisting of an upper conical part and a lower inverted conical part, said casing having a material receiving inlet; an upright conical material dispersing plate within said casing lying below said inlet; an air suction pipe entering said casing and having an enlarged circular inverted conical mouth lying beneath the conical material dispersing plate; a frusto-conical air baffle plate surrounding the mouth of the air suction pipe and lying below and adjacent to the circular lower edge of the material dispersing plate; said casing being closed adjacent the edges of the material dispersing plate and the air baffle plate and having an air inlet in the lower inverted conical part a substantial distance below said edges; and air exhausting means attached to the outer end of the air suction pipe.

In testimony whereof I have hereunto set my hand and seal this 15 day of May 1925.

BERNARD M. ELY.